C. L. HEACOCK.
CARBURETER CONTROLLER.
APPLICATION FILED OCT. 13, 1919.

1,365,242.

Patented Jan. 11, 1921.
2 SHEETS—SHEET 1.

Inventor
C. L. Heacock

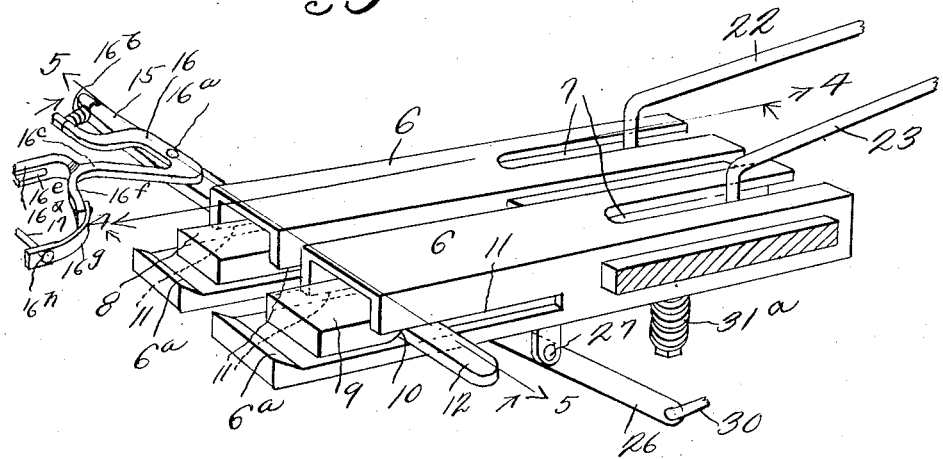
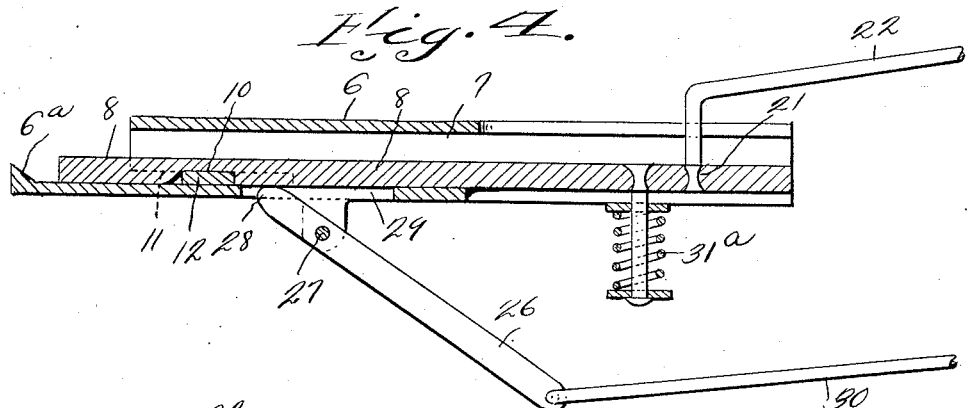
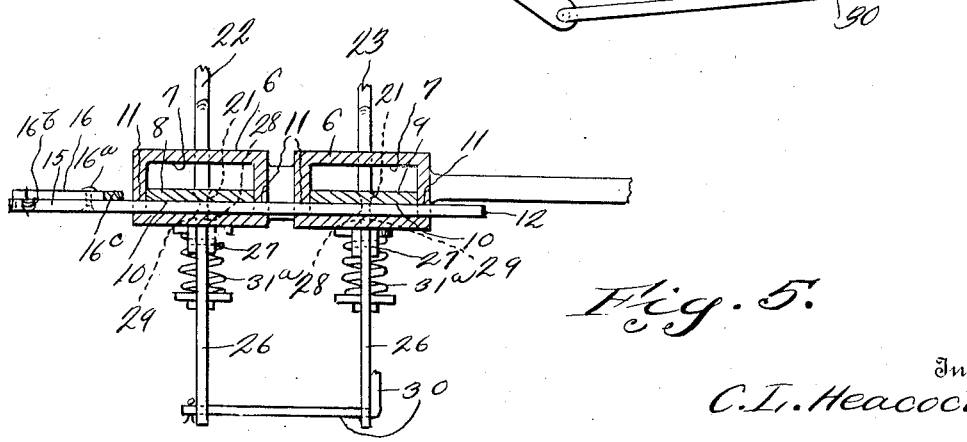

UNITED STATES PATENT OFFICE.

CHARLIS L. HEACOCK, OF GRETNA, NEBRASKA.

CARBURETER-CONTROLLER.

1,365,242.   Specification of Letters Patent.   Patented Jan. 11, 1921.

Application filed October 13, 1919. Serial No. 330,369.

*To all whom it may concern:*

Be it known that I, CHARLIS L. HEACOCK, a citizen of the United States, residing at Gretna, in the county of Sarpy and State of Nebraska, have invented certain new and useful Improvements in Carbureter-Controllers, of which the following is a specification, reference being had therein to the accompanying drawing.

The invention relates to controlling mechanisms operated by the foot levers of an internal combustion engine of an automobile whereby the flow of gas within the carbureter is cut off or diminished when the foot levers are operated, thereby allowing the saving of fuel especially when the automobile is going down grade.

A further object is to provide slidable bars, which slidable bars are connected to the foot levers and are adapted to be moved for operating a lever disposed transversely in notches in said slides whereby the carbureter control lever may be moved for cutting off the flow of gas.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Fig. 3 is a detail perspective view of the slide cases and adjacent mechanism.

Fig. 4 is a longitudinal sectional view taken on line 4—4 of Fig. 3.

Fig. 5 is a transverse sectional view taken on line 5—5 of Fig. 3.

Figure 1:
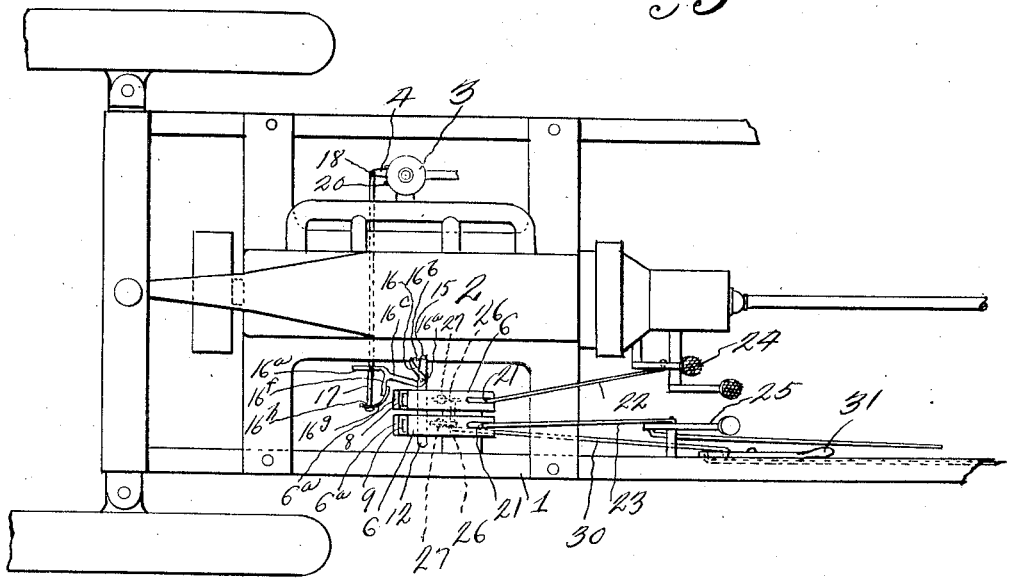
Figure 1 is a plan view of the forward end of a motor driven vehicle showing the carbureter controlled mechanism applied thereto.
Figure 2:
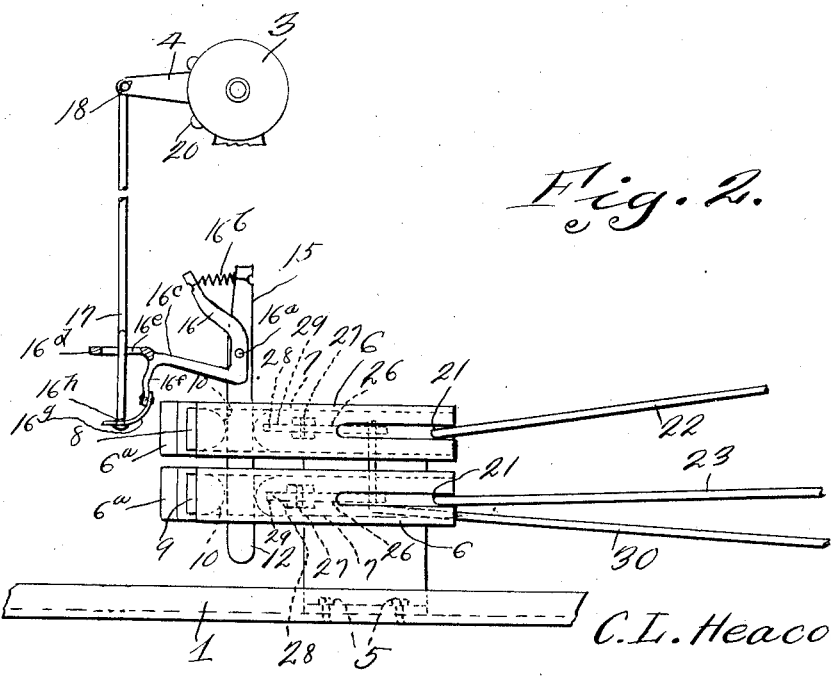
Fig. 2 is an enlarged detail view of the control mechanism in plan.

Referring to the drawings, the numeral 1 designates a conventional form of automobile and 2 an engine carried by the frame thereof. Engine 2 is provided with a conventional form of carbureter 3, which carbureter is controlled by a lever 4. Secured to one of the side rails of the frame of the automobile as at 5 is a pair of casings 6, which casings are provided with longitudinal chambers 7, in which slides 8 and 9 are adapted to be moved. The ends of the casings are provided with inclined surfaces $6^a$. Slides 8 and 9 are provided on their under faces with notches 10 and transversely disposed in said notches and passing through slots 11 in the side walls of the casings 6 is a lever 12, which is adapted to be moved forwardly or rearwardly to move arm 9. Secured to the end 15 of the lever 12 as at $16^a$ is a bell crank 16, one arm of which is secured to the lever 12 by spring $16^b$. The arm $16^c$ terminates in an arm $16^d$ having an elongated aperture $16^e$ and an arm $16^f$ to which is secured a leaf spring $16^g$ to the end of which is secured as at $16^h$ a transversely disposed connecting rod 17. The connecting rod 17 is pivoted as at 18 to the carbureter control arm 4. The springs $16^b$ and $16^g$ normally hold the carbureter arm in closed position and the bell crank 16 forms a resilient connection so that the movement of rods 22 and 23 will not be limited. Pivotally connected as at 21 to the rear end of the slides 8 and 9 are connecting rods 22 and 23. Connecting rod 22 has its rear end pivotally connected to the clutch pedal 24, while the connecting rod 23 is connected to the foot lever 25; therefore it will be seen that when the clutch is thrown in, connecting rod 22 will move slide 8 forwardly, thereby forcing the inner end of the bar 12 forwardly and imparting a pull inwardly on the carbureter arm 4, thereby increasing the amount of gas supplied to the carbureter. However, when the foot lever 25 which operates the brake is pushed forwardly, slide 9 will force the outer end of the transverse bar 12 forwardly thereby moving the arm so as to cut off the flow of gas to the carbureter this being particularly advantageous where the machine is coasting or going down hill, and it materially saves the consumption of fuel.

Levers 26 are secured and pivoted as at 27 between ears on the under faces of the casings 6 and have their ends 28 disposed in slots 29 so that said ends will engage the under faces of the slides 8 and 9, said levers having a connecting rod 30 connected to them and also connected to an emergency brake lever 31 so that when said emergency brake lever is moved ends 28 will engage under the slides 8 and 9 thereby raising the same against the action of the coiled springs $31^a$ and consequently raising the notches 10 out of engagement with the transversely disposed lever 12, thereby allowing the manipulation of clutch and foot lever pedals 24 and 25 without consequent movement of the carbureter lever.

The invention having been set forth what is claimed as new and useful is:—

1. A carbureter feed control comprising a pair of slides, said slides being mounted in parallel casings, a transversely disposed lever extending through slots in the walls of said casings, notches in the ends of said slides for the reception of said transversely disposed lever and connecting rods connected to said slides whereby the transversely disposed lever may be moved simultaneously or independently for increasing or diminishing the flow of fuel in the carbureter.

2. A carbureter feed control comprising a pair of slides, said slides being mounted in parallel casings, a transversely disposed lever extending through slots in the walls of said casings, notches in the ends of said slides for the reception of said transversely disposed lever, a connecting rod between said transversely disposed lever and a carbureter control lever, connecting rods connected to said slides and to the engine control levers, pivoted levers carried on the under faces of the casings whereby when the emergency brake lever is operated, said slides will be raised for allowing the manipulation of clutch and foot lever pedals without consequent movement of the carbureter lever, and springs carried by said slides whereby they will be maintained normally in engagement with the bottom of the casing.

In testimony whereof I hereunto affix my signature.

CHARLIS L. HEACOCK.